(12) United States Patent
Park et al.

(10) Patent No.: US 10,666,947 B2
(45) Date of Patent: *May 26, 2020

(54) METHOD AND APPARATUS FOR PROCESSING A VIDEO SIGNAL

(71) Applicant: LG Electronics Inc., Seoul (KR)

(72) Inventors: Seungwook Park, Seoul (KR); Joonyoung Park, Seoul (KR); Jungsun Kim, Seoul (KR); Younghee Choi, Seoul (KR); Yongjoon Jeon, Seoul (KR); Jaewon Sung, Seoul (KR); Byeongmoon Jeon, Seoul (KR); Jaehyun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,858

(22) Filed: Dec. 19, 2018

(65) Prior Publication Data

US 2019/0124336 A1 Apr. 25, 2019

Related U.S. Application Data

(63) Continuation of application No. 15/942,897, filed on Apr. 2, 2018, now Pat. No. 10,397,580, which is a
(Continued)

(51) Int. Cl.
*H04N 19/51* (2014.01)
*H04N 19/56* (2014.01)
(Continued)

(52) U.S. Cl.
CPC ......... *H04N 19/139* (2014.11); *H04N 19/105* (2014.11); *H04N 19/159* (2014.11);
(Continued)

(58) Field of Classification Search
CPC .. H04N 19/105; H04N 19/139; H04N 19/159; H04N 19/167; H04N 19/51;
(Continued)

(56) References Cited

U.S. PATENT DOCUMENTS 7,263,236 B2    8/2007   Park
7,466,774 B2   12/2008   Boyce
(Continued)

FOREIGN PATENT DOCUMENTS

CN       1549206      11/2004
CN     101472174       7/2009
(Continued)

OTHER PUBLICATIONS

International Search Report dated Jan. 10, 2012 for Application No. PCT/KR2011/003350 with English Translation, 8 pages.
(Continued)

*Primary Examiner* — Anner N Holder
(74) *Attorney, Agent, or Firm* — Fish & Richardson P.C.

(57) ABSTRACT

The present invention discloses a method and apparatus for encoding or decoding a video signal. The method for processing a video signal according to the present invention uses a merging mode in which prediction information on a neighbor unit is used instead of transmitting prediction information on the present unit, so as to improve coding efficiency. In this case, the number of available candidate units for merging among the units in a predetermined position is determined, and information for the merging mode is acquired on the basis of the number of the available candidate units for merging. The unit to be merged is determined using the information for the merging mode, and prediction information on the unit to be merged is acquired. The prediction value for the present unit is acquired using
(Continued)

the prediction information on the unit to be merged, and the present unit is restored using the acquired prediction value.

19 Claims, 12 Drawing Sheets

Related U.S. Application Data continuation of application No. 15/143,719, filed on May 2, 2016, now Pat. No. 9,936,202, which is a continuation of application No. 14/624,739, filed on Feb. 18, 2015, now Pat. No. 9,357,218, which is a continuation of application No. 13/695,838, filed as application No. PCT/KR2011/003350 on May 4, 2011, now Pat. No. 9,363,520.

(60) Provisional application No. 61/414,436, filed on Nov. 17, 2010, provisional application No. 61/412,801, filed on Nov. 12, 2010, provisional application No. 61/333,273, filed on May 11, 2010, provisional application No. 61/330,902, filed on May 4, 2010.

(51) Int. Cl.
| | |
|---|---|
| *H04N 19/61* | (2014.01) |
| *H04N 19/96* | (2014.01) |
| *H04N 19/105* | (2014.01) |
| *H04N 19/139* | (2014.01) |
| *H04N 19/159* | (2014.01) |
| *H04N 19/167* | (2014.01) |
| *H04N 19/513* | (2014.01) |

(52) U.S. Cl.
CPC ........... *H04N 19/167* (2014.11); *H04N 19/51* (2014.11); *H04N 19/521* (2014.11); *H04N 19/56* (2014.11); *H04N 19/61* (2014.11); *H04N 19/96* (2014.11)

(58) Field of Classification Search
CPC ...... H04N 19/521; H04N 19/56; H04N 19/61; H04N 19/96
See application file for complete search history.

(56) References Cited

U.S. PATENT DOCUMENTS

| | | | |
|---|---|---|---|
| 7,586,985 B2 | 9/2009 | Park | |
| 7,593,467 B2 | 9/2009 | Park | |
| 7,627,034 B2 | 12/2009 | Park | |
| 7,688,897 B2 | 3/2010 | Park | |
| 7,746,933 B2 | 6/2010 | Park | |
| 7,787,540 B2 | 8/2010 | Park | |
| 7,864,841 B2 | 1/2011 | Park | |
| 7,864,849 B2 | 1/2011 | Park | |
| 7,970,057 B2 | 6/2011 | Park | |
| 8,363,936 B2 | 1/2013 | Divorra | |
| 8,553,774 B2 | 10/2013 | Jeon | |
| 9,357,218 B2 | 5/2016 | Park | |
| 9,363,520 B2 | 6/2016 | Park | |
| 2004/0081238 A1 | 4/2004 | Parhy | |
| 2004/0150639 A1 | 8/2004 | Park | |
| 2006/0188024 A1 | 8/2006 | Suzuki et al. | |
| 2006/0222067 A1 | 10/2006 | Park | |
| 2006/0222068 A1 | 10/2006 | Park | |
| 2006/0222069 A1 | 10/2006 | Park | |
| 2006/0222070 A1 | 10/2006 | Park | |
| 2006/0233249 A1 | 10/2006 | Park | |
| 2006/0233263 A1 | 10/2006 | Park | |
| 2007/0189382 A1 | 8/2007 | Park | |
| 2007/0189385 A1 | 8/2007 | Park | |
| 2008/0165855 A1 | 7/2008 | Wang | |
| 2009/0060034 A1 | 3/2009 | Park | |
| 2009/0180550 A1 | 7/2009 | Park | |
| 2009/0180551 A1 | 7/2009 | Park | |
| 2009/0185627 A1 | 7/2009 | Park | |
| 2009/0196354 A1 | 8/2009 | Park | |
| 2009/0196517 A1 | 8/2009 | Divorra | |
| 2010/0124273 A1 | 5/2010 | Divorra | |
| 2010/0272188 A1 | 10/2010 | Park | |
| 2011/0129015 A1 | 6/2011 | Nguyen | |
| 2013/0287116 A1 | 10/2013 | Helle | |

FOREIGN PATENT DOCUMENTS

| | | |
|---|---|---|
| CN | 101507280 | 8/2009 |
| CN | 101617538 | 12/2009 |
| EP | 1 431 919 | 6/2004 |
| EP | 1 875 919 | 1/2008 |
| EP | 2 106 666 | 10/2009 |
| EP | 2 055 108 | 4/2011 |
| JP | 2004-185628 | 7/2004 |
| KR | 10-2009-0007461 | 1/2009 |
| KR | 10-2009-0057225 | 6/2009 |
| KR | 10-2009-0108073 | 10/2009 |
| WO | 2006/104364 | 10/2006 |
| WO | 2006/104365 | 10/2006 |
| WO | 2006/104366 | 10/2006 |
| WO | 2006/109155 | 10/2006 |
| WO | 2006/109986 | 10/2006 |
| WO | 2008/027192 | 3/2008 |
| WO | 2008/084423 | 7/2008 |
| WO | 2008/127597 | 10/2008 |
| WO | 2006/115057 | 12/2008 |

OTHER PUBLICATIONS

Chinese Office Action dated Oct. 30, 2014 for Chinese Application No. 2011-80022511, with English translation, 10 pages.
Extended European Search Report issued in European Application No. 11777580.9 dated Jan. 29, 2016, 12 pages.
Amonou et al., "Video coding technology proposal by France Telecom, NTT, NIT DoCoMo, Panasonic and Technicolor," 1st JCT-VC Meeting; Apr. 4, 2010-Apr. 23, 201; Dresden; (Joint Collaborative Team on Video Coding ofISO/EC JCT1/SC29/WG11 and ITU-TSG.16), no. JCTVCA 114-Annex A, May 7, 2010 (May 7, 2010), XP030007553, 107 pages.
JCT-VC: "Test Model under Consideration (TMuC)," IstJCT-VC Meeting; Apr. 15, 2010-Apr. 23, 2010; Dresden; (Joint collaborative Team on Video Coding ofISO/IEC JTC1/SC29/WG11 and ITUTSG. 16); No. JCTVC-A205, Apr. 23, 2010 Apr. 23, 2010), XP030007586, 153 pages.
Lim et al., "Video coding technology proposal by SK telecom, Sejong University and Sungkyunkwan University," 151 JCT-VC Meeting; Apr. 15, 2010-Apr. 23, 2010; Dresden; (Joint Collaborative Team on Video Coding ofISO/IEC JTC1/SC29/WG11 and ITU-TSG.16); No. JCTVC-AII3, Apr. 13, 2010 (Apr. 13, 2010), XP030007551, 41 pages.
Niegand et al., "Overview of the H.264/AVC video coding standard," IEEE Transactions on Circuits and Systems for Video Technology, IEEE Service Center, Piscataway, NJ, US, vol. 13, No. 7, Jul. 1, 2003 (Jul. 1, 2003), pp. 560-576, KP011221093.
Ninken et al., "Video coding technology proposal by Fraunhofer HHI," 1st JCT-VC Meeting; Apr. 15, 2010-Apr. 23, 2010; Dresden; (Joint Collaborative Team on Video Coding ofISO/IECJTC1/SC29/ WG11 and ITU-TSG.16), No. JCTVC-1\116, Apr. 24, 2010 (Apr. 24, 2010, XP030007557, 44pages.
Vang et al., "Video coding technology proposal by Huawei Technologies and Hisilicon Technologies," 1st JCT-VC Meeting; Apr. 15, 2010-Apr. 23, 2010; Dresden; (Joint Collaborative Team on Video Coding of ISO/IEC JTC1/SC29/WG 11 and ITU-TSG.16); no. JCTVC-AIII, Apr. 17, 2010 (Apr. 17, 2010), XP030007548, 26 pages.
Chinese Office Action in Chinese Application No. 201510167465.0, dated Aug. 2, 2017, 10 pages (with English translation).
Chinese Office Action in Chinese Application No. 201510169327.6, dated Aug. 1, 2017, 10 pages (with English translation).

(a)  (b)  (c)

(a)

(b)

(a)

(b)

(a)

(b)

(c)

METHOD AND APPARATUS FOR PROCESSING A VIDEO SIGNAL

CROSS REFERENCE TO RELATED APPLICATIONS

This application is a continuation of U.S. application Ser. No. 15/942,897, filed Apr. 2, 2018, which is a continuation of U.S. application Ser. No. 15/143,719, filed May 2, 2016, now U.S. Pat. No. 9,936,202, which is a continuation of U.S. application Ser. No. 14/624,739, filed Feb. 18, 2015, now U.S. Pat. No. 9,357,218, which is a continuation of U.S. application Ser. No. 13/695,838, filed Jan. 16, 2013, now U.S. Pat. No. 9,363,520, which is a U.S. National Phase Application under 35 U.S.C. § 371 of International Application PCT/KR2011/003350, filed on May 4, 2011, which claims the benefit of U.S. Provisional Application No. 61/330,902, filed on May 4, 2010, U.S. Provisional Application No. 61/333,273, filed on May 11, 2010, U.S. Provisional Application No. 61/412,801, filed on Nov. 12, 2010 and U.S. Provisional Application No. 61/414,436, filed on Nov. 17, 2010, the entire contents of which are hereby incorporated by reference in their entireties.

DESCRIPTION

Technical Field

The present invention relates to a method and apparatus for processing a video signal, and more particularly, to a method and apparatus for encoding or decoding a video signal.

Background Art

Compression encoding refers to a signal processing technology for transmitting digitized information through a communication line or storing such information in a form which is appropriate for a storage medium. Voices, images, letters, etc. may be compression-encoded, and particularly a technology for performing compression encoding of images is called video image compression. Compression encoding of a video signal may be performed by removing surplus information in consideration of spatial correlation, temporal correlation, probabilistic correlation, etc. However, with recent development of various media and data transmission media, there is a need for a high efficiency video signal processing method and apparatus.

DISCLOSURE

Technical Problem

An object of the present invention devised to solve the problem lies in reducing transmitted prediction information by restoring a current unit through a merging mode which uses prediction information of another already restored unit in inter prediction of the current unit.

Another object of the present invention devised to solve the problem lies in efficiently implementing a prediction mode and more accurately predicting prediction information of a current block.

Yet another object of the present invention devised to solve the problem lies in selecting appropriate merging candidate units and efficiently determining a unit to be merged in consideration of characteristics of the current unit and merged neighbor areas.

Yet another object of the present invention devised to solve the problem lies in providing a method for enhancing efficiency in a signaling method for implementing a prediction mode.

Technical Solution

The present invention has been designed to solve the above problems, and the method for processing a video signal according to the present invention uses a structure for recursively partitioning one coding unit into several coding units and a method thereof. Further, such a coding unit is divided into various forms of prediction units, and thereby the accuracy of motion prediction compensation may be enhanced.

The present invention may use a merging mode for increasing coding efficiency. Here, a method of selecting merging candidate units in various positions is presented.

The present invention presents an efficient signaling method for specifying a unit to be merged among merging candidate units. Further, the present invention presents a method for inducing a unit to be merged without transmitting the information. To this end, a method of adaptively determining a unit to be merged may be used in consideration of various conditions such as the position of a current unit and neighbor units, unit size, motion information, etc.

Advantageous Effects

According to a method for processing a video signal according to the present invention, complexity, which is needed for acquiring motion information of a current unit, may be reduced by the merger between units in performing inter prediction, and coding efficiency may be enhanced by not transmitting prediction information of the current unit.

Further, characteristics of images or objects within the images may be well reflected by the prediction and merger in various unit sizes and partition units, and more accurate prediction is possible.

Further, flexibility of merger may be extended by selecting neighbor units of various positions as units to be merged, and more accurate prediction information may be acquired.

Further, merging candidate units and/or units to be merged may be efficiently and adaptively determined in consideration of various conditions such as the positions of a current unit and neighboring units, the unit size, motion information, etc.

Further, information needed for a merging mode is set to be transmitted only when necessary, and an unnecessarily redundant case is removed, thereby enhancing coding efficiency.

BEST MODE

Figure 1:
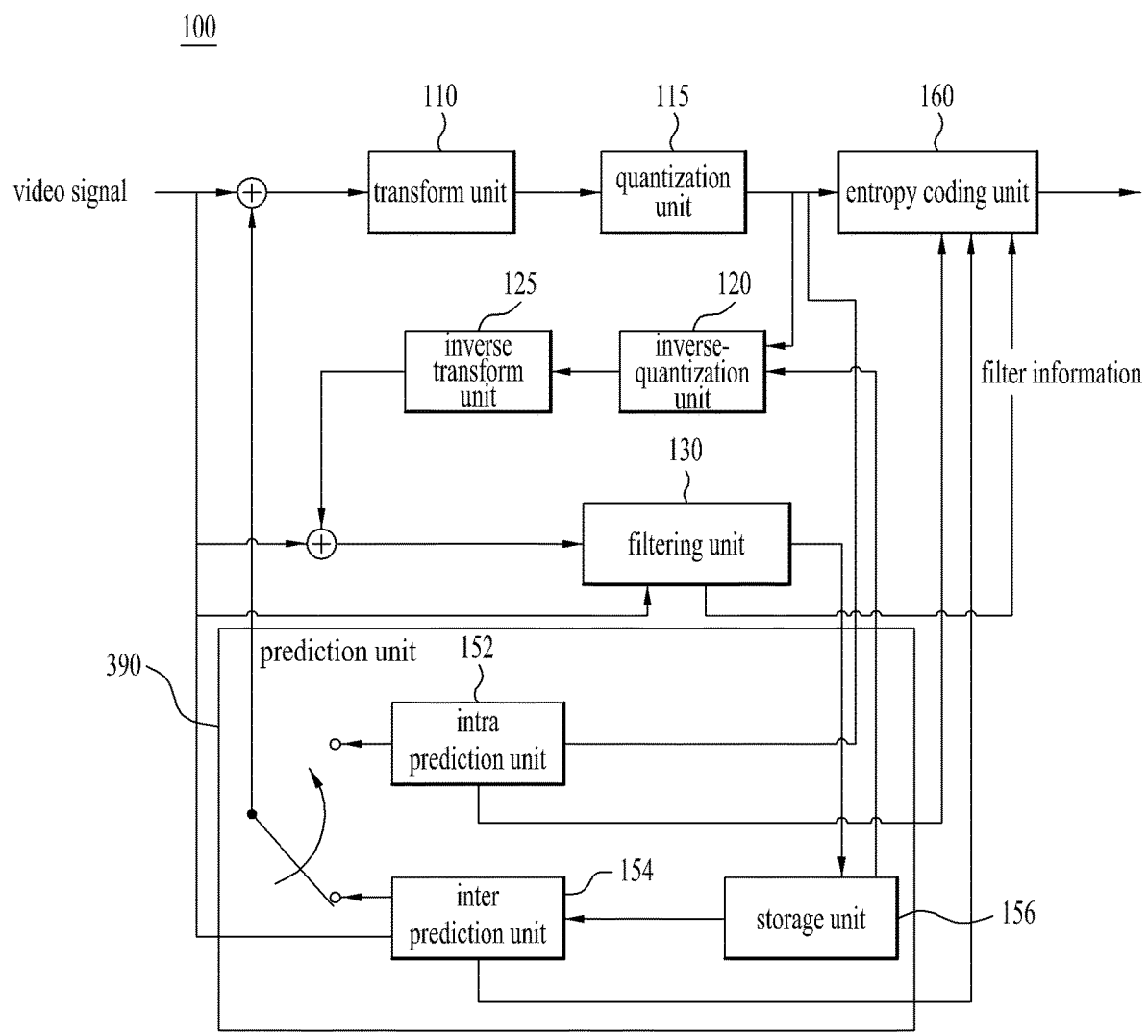
FIG. 1 is a schematic block diagram of a video signal encoder device according to an exemplary embodiment of the present invention.

The object of the present invention can be achieved by providing a method for processing a video signal including determining a number of available merging candidate units, obtaining a merging flag indicating whether a current unit uses a merging mode if the number of the available merging candidate units is larger than 0, obtaining merging information of the current unit if the merging flag indicates that the current block is a merge mode and the number of the available merging candidate units is larger than 1, determining a unit to be merged using the merging information, obtaining prediction information of the unit to be merged, obtaining a pixel prediction value of the current unit using the prediction information of the unit to be merged, and restoring a pixel value of the current unit using the pixel prediction value of the current unit.

Here, the determining determines a number of available units among a plurality of candidate units which are selected based on a position of the current unit.

Further, the candidate units include at least one of a first group composed of units adjacent to an upper outline of the current unit, a second group composed of units adjacent to a left outline of the current unit, a third group composed of units adjacent to a corner of the current unit, and a fourth group composed of units located in another image which does not include the current unit.

The method for processing the video signal further includes determining each of the units among the groups as the merging candidate units, wherein the units consider a length of the outline adjacent to the current unit, areas of the units, or motion vectors of the units.

Further, the determining counts a number of units, which have been coded by an inter mode and have prediction information, and have been decoded ahead of the current unit, among the candidate units.

Further, the merging information is a merging direction flag indicating whether a certain direction neighbor unit of the current unit is the unit to be merged in the case in which the number of the merging candidates is 2, and the merging information is an index indicating the unit to be merged in the case in which the number of the merging candidates is larger than 2. Further, the prediction information includes an index of a reference image and motion vector information.

MODE FOR INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as having meanings and concepts matching the technical idea of the present invention based on the principle that an inventor is able to appropriately define the concepts of the terminologies to describe an invention as best possible. The embodiment disclosed in this disclosure and configurations shown in the accompanying drawings are just one preferred embodiment and do not represent all technical ideas of the present invention. Therefore, it is understood that the present invention covers the modifications and variations of this invention provided they come within the scope of the appended claims and their equivalents at the time of filing this application.

The following terms in the present invention may be understood based on the following criteria, and even undisclosed terms may be understood according to the intention described below. "Coding" may be understood as encoding or decoding depending on the situation, and "information" includes values, parameters, coefficients, elements, etc. and may be understood as an appropriate concept depending on situation. "Screen" or "picture" generally refers to a unit for indicating one image at a specific time zone, and slice, frame, etc. is a unit for forming part of a picture in coding an actual video signal, but may be switchable. "Pixel" or "Pel" refers to a minimum unit for constituting one image. "Sample" may be used as a term for indicating the value of a specific pixel. "Sample" may be divided into Luma and Chroma elements, but is generally used as a term including both elements. In the above, "Chroma" indicates a difference between determined colors, and generally comprises Cb and Cr. "Unit" has been used to mean the basic unit of image processing or a specific position of an image, and may be used together with terms such as "block" or "area".

The present invention relates to a method and apparatus for encoding or decoding a video signal. FIG. 1 is a schematic block diagram of a video signal encoding device according to an exemplary embodiment of the present invention. Referring to FIG. 1, the encoding device 100 of the present invention includes a transform unit 110, a quantization unit 115, an inverse quantization unit 120, an inverse transform unit 125, a filtering unit 130, a prediction unit 150 and/or an entropy coding unit 160.

The transform unit 110 acquires a transform coefficient by transforming a pixel value for an input video signal. Some examples of such a transform method are discrete cosine transform (DCT), discrete sine transform (DST) wavelet transform, etc. The transform unit 110 performs transform by partitioning an input image signal into units of a certain size. The basic unit at the transform is called a transform unit. The coding efficiency may be changed according to the distribution and attributes of values within the transform area.

The quantization unit 115 quantizes a transform coefficient value output from the transform unit 110. The inverse quantization unit 120 inverse-quantizes the transform coefficient value, and the inverse transform unit 125 restores a pixel value using the inverse quantized transform coefficient value.

The filtering unit 130 performs a filtering operation for objective or subjective quality improvement of an image. Some examples of filters used in the filtering unit are a deblocking filter and/or an adaptive loop filter, etc. The storage unit 156 stores an image to which filtering has been applied, so as to output the image or use the image as a reference image.

In general video coding, an image signal is not coded as itself to enhance coding efficiency, but a method of predicting an image using an already coded area, and acquiring a restored image by adding a residual value between the original image and the predicted image to the predicted image is used. Some examples of the method of predicting an image are intra prediction (prediction within a screen), inter prediction (inter-screen prediction), etc., and thus the prediction unit may include an intra prediction unit 152 and an inter prediction unit 154. The intra prediction unit 152 performs intra prediction from restored areas within the current image, thereby transmitting the encoding information within the screen to the entropy coding unit 160. The inter prediction unit 154 acquires a motion vector value of the current area, and performs inter-screen motion compensation with reference to a specific area, i.e., reference area, of another restored image using the acquired motion vector value. Further, the inter prediction unit 154 transmits location information of the reference area (reference frame information, motion vector, etc.) to the entropy coding unit 160 so that the information may be included in the bitstream.

The entropy coding unit 160 generates a video signal bitstream by entropy-coding a quantized transform coefficient, inter coding information, intra coding information, reference area information, etc. The entropy coding unit 160 may use variable length coding (VLC), arithmetic coding, etc. The variable length coding method transforms input symbols into consecutive codewords, and the length of the codeword may be variable. For example, frequently generated symbols are expressed as short codewords, and non-frequently generated symbols are expressed as long codewords. Context-based Adaptive Variable Length Coding (CAVLC) may be used as a variable length coding method. The arithmetic coding transforms consecutive data symbols into one prime number, and may obtain an optimal prime number bit to express each symbol. As arithmetic coding, Context-based Adaptive Binary Arithmetic Coding (CABAC) may be used.

Figure 2:
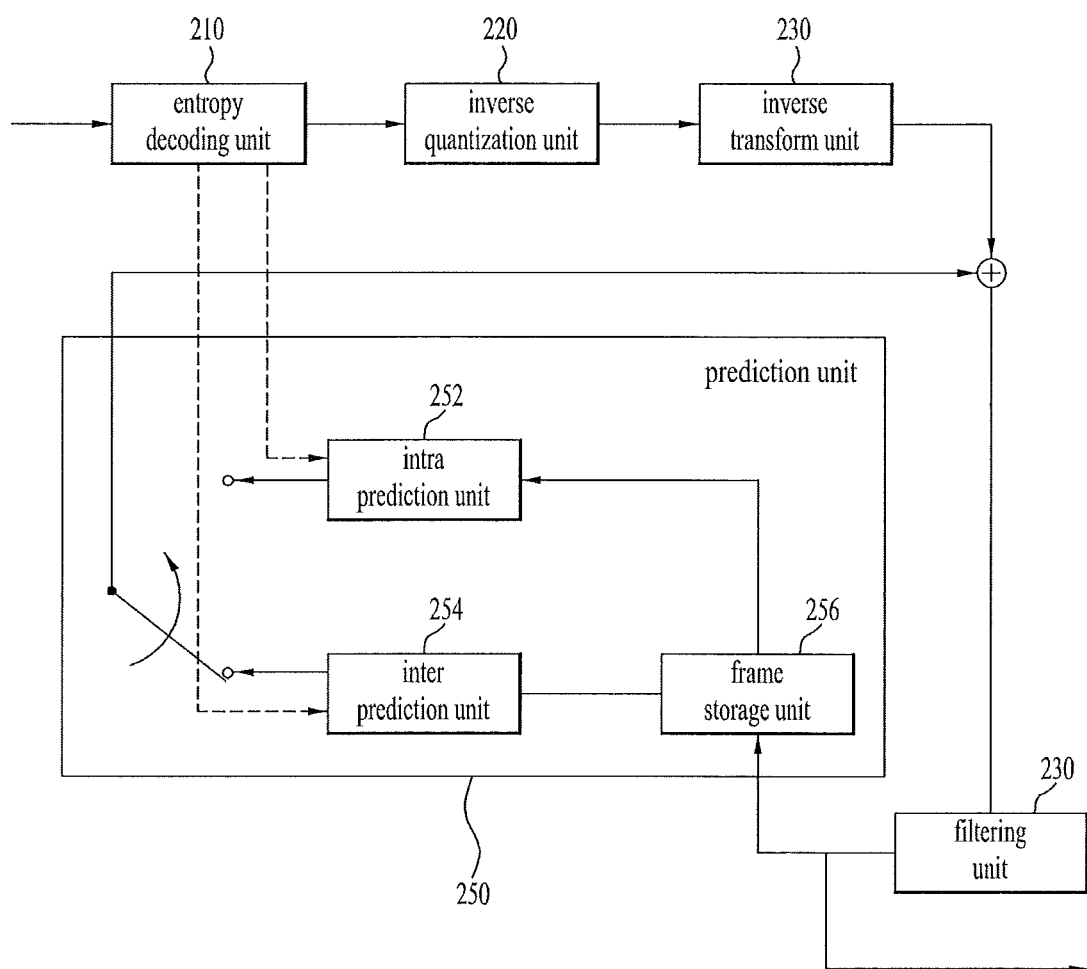
FIG. 2 is a schematic block diagram of a video signal decoder device according to an exemplary embodiment of the present invention.

FIG. 2 is a schematic block diagram of a video signal decoding device 200 according to an exemplary embodiment of the present invention. The operation of the decoding device 200 corresponds to the operation of each part of the encoder, and performs a reverse process of the corresponding operation. Referring to FIG. 2, the decoding device 200 of the present invention may include an entropy decoding unit 210, an inverse quantization unit 220, an inverse transform unit 225, a filtering unit 230 and/or a prediction unit 250, etc.

The entropy decoding unit 210 entropy-decodes a video signal bitstream, and thereby extracts the transform coefficient and prediction information, etc. for each area. The inverse quantization unit 220 inverse-quantizes the entropy-decoded transform coefficient, and the inverse quantization unit 220 inverse-quantizes the entropy-decoded transform coefficient and restores the original pixel value using the inverse quantized transform coefficient.

Further, the filtering unit 230 improves image quality by filtering an image. Here, a deblocking filter for reducing a block distortion phenomenon and/or an adaptive loop filter for removing distortion of the entire image, etc. may be included. The image, which has been filtered, is output or is stored in the storage unit 256 to be used as a reference image.

Further, the prediction unit 250 of the present invention includes an intra prediction unit 252 and an inter prediction unit 254, and restores a prediction image by utilizing information such as an encoding type decoded through the above mentioned entropy decoding unit 210, a transform coefficient for each area, a motion vector, etc.

Here, the intra prediction unit 252 performs intra prediction from the decoded sample within the current image, thereby generating a prediction image. The inter prediction unit 254 generates a prediction image using a motion vector and a reference image stored in the storage unit 256. When acquiring a motion vector, a method such as motion vector prediction and motion vector competition, etc. may be used.

The restored video frame is generated by adding the residual value for each pixel restored from the inverse transform unit to the prediction image, which is output from the intra prediction unit 252 or the inter prediction unit 254. The operation of the inter prediction unit 254, particularly various processing methods in the merge mode will be described later.

Figure 4:
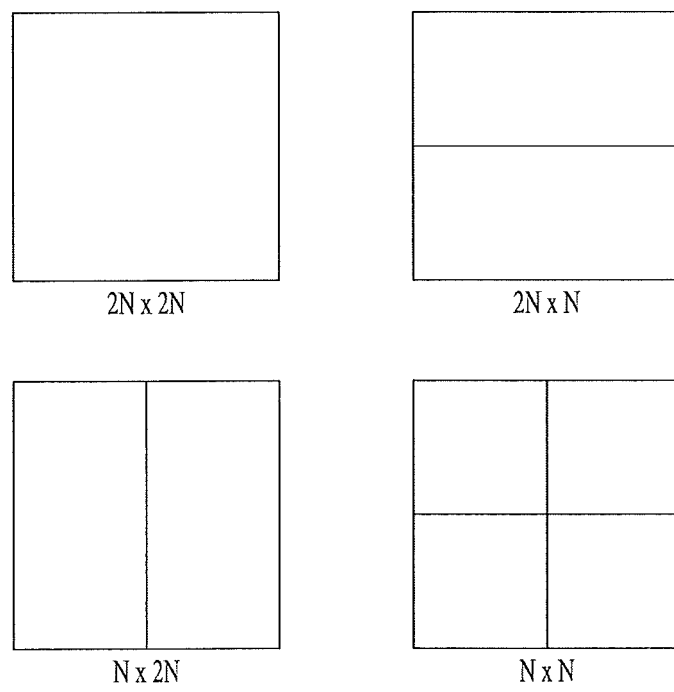
FIG. 4 illustrates various partitioning methods of a prediction unit and names of the partition types.
Figure 5:
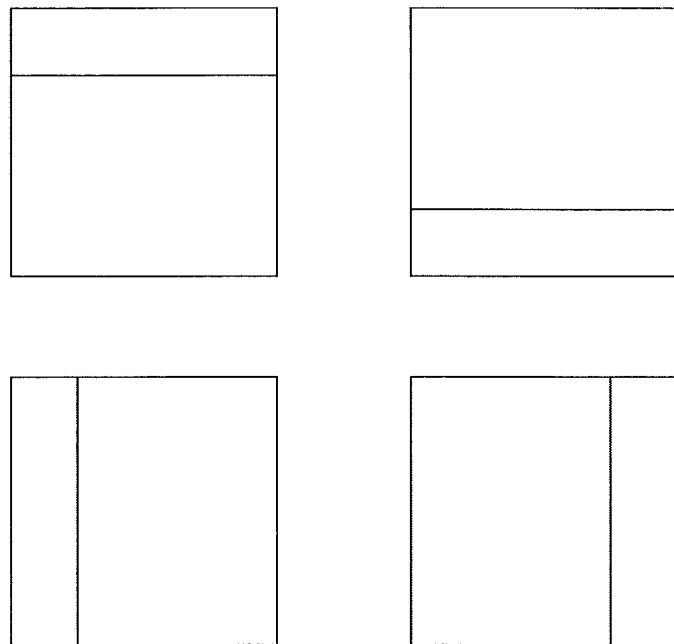
FIG. 5 illustrates a case of asymmetrically partitioning a prediction unit.

Hereinafter, a method of partitioning a coding unit and a prediction unit, etc. in the operation of the encoding device 100 and the decoding device 200 will be described with reference to FIGS. 3 to 5. The coding unit refers to a basic unit for processing an image in a process such as the above described process of processing a video signal, for example, intra or inter prediction, transform, quantization, entropy coding, etc. The size of the coding unit used in coding one image may not be consistent. The coding unit may have a quadrilateral form, and one coding unit may be partitioned into several coding units.

Figure 3:
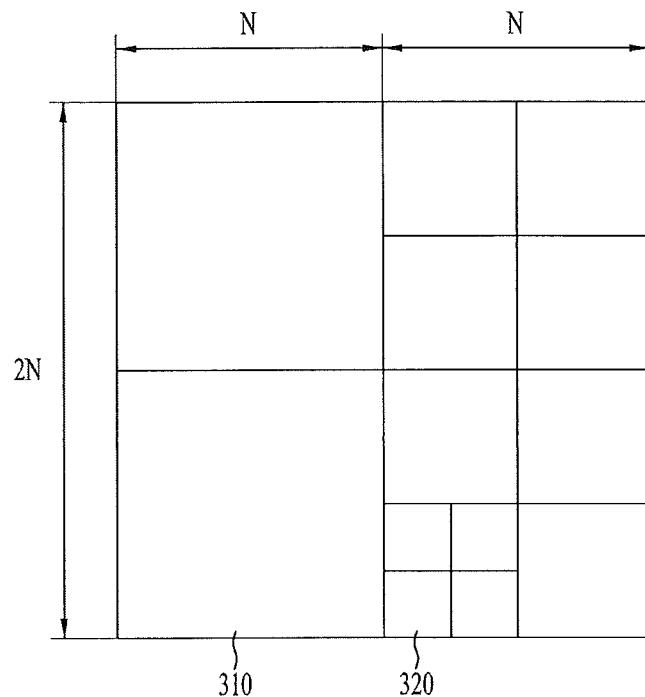
FIG. 3 illustrates an example of partitioning a coding unit according to an exemplary embodiment of the present invention.

FIG. 3 illustrates an example of partitioning a coding unit according to an exemplary embodiment of the present invention. For example, one coding unit having a size of 2N×2N may be partitioned into four coding units having a size of N×N. Such a partition of the coding unit may be performed recursively, and not all coding units need to be partitioned in the same form. However, for convenience in the coding and processing process, there may be a restriction on the maximum size 310 and the minimum size 320. If the maximum size of the coding unit is determined, the maximum size is called the maximum coding unit size, if the minimum size is determined, the minimum size is called the minimum coding unit size.

Information on whether the coding unit is partitioned may be indicated for one coding unit. For example, if the flag value, which indicates whether the coding unit is to be partitioned, is 1, the block corresponding to the node is partitioned into four blocks again, and if the flag value is 0, the block is not partitioned any more, and the process of processing the coding unit may be performed.

The block does not necessarily have to be partitioned into four forward areas. In such a case, codes about predetermined partition methods may be mapped with partition information. For example, if the information value is 1, the block may be divided into two horizontal rectangular sub-blocks, if the value is 2, the block may be divided into two vertical rectangular subblocks, and if the value is 3, the block may be divided into four square subblocks. Such a method shows some examples of the partition method, but the present invention is not limited thereto.

The structure of the above described coding unit may be indicated using a recursive tree structure. That is, the coding unit, which is partitioned into other coding units using the one image or the maximum size coding unit as the root, comes to have child nodes corresponding to the number of partitioned coding units. Hence, the coding unit, which is not further partitioned, becomes a leaf node. Assuming that only square type partition is possible for one coding unit, one coding unit may be partitioned into a maximum of 4 other coding units, and thus the tree, which indicates the coding unit, may be of a Quad tree form. Hereinafter, for convenience of explanation, the coding unit having the maximum coding unit size is called a largest coding unit (LCU), and the coding unit having the minimum coding unit size is called a smallest coding unit (SCU).

In the encoder, the optimal coding unit size may be selected according to characteristics of a video image (e.g., a resolution) or in consideration of coding efficiency, and information thereof and information for drawing the same may be included in the bitstream. For example, the size of the maximum coding unit and the maximum depth of the tree may be defined. In the case of a square type partition, the height and width of the coding unit is half the height and width of the coding unit of the parent node, and thus the minimum coding unit size may be calculated using the above information. Further, in a reverse manner, the minimum coding unit size and the maximum depth of the tree may be defined in advance, and the size of the maximum coding unit may be induced using the defined information. In the square type partition, the unit size is changed into a form of a multiple of 2, and thus the size of the actual coding unit is indicated as a log value having 2 as the base, thereby enhancing transmission efficiency.

In the decoder, information, which indicates whether the above described current coding unit has been partitioned, may be acquired. Efficiency may be enhanced if such information is obtained (or transmitted) only under a specific condition. For example, if the current coding unit is the minimum coding unit size, the unit is not partitioned into smaller coding units, and thus in such a case, information on whether the unit has been partitioned does not need to be obtained.

If the information indicates that the coding unit has been partitioned, the size of the coding unit to be partitioned becomes half of the current coding unit size, and the coding unit partitioned into four square type coding units based on the current processing location. The above processing may be repeated for each partitioned coding unit.

Image prediction for coding is performed for the coding unit which is not further partitioned (that is, the leaf node of the coding unit tree). The coding unit is divided into one or more prediction units (PU), prediction blocks or partitions, and such a division is also called partition. The way one unit has been partitioned may be indicated by prediction unit type information or partition type information, etc. FIG. 4 illustrates various partition methods of the prediction unit and an example of the partition type name. Referring to FIG. 4, one prediction unit having a size of 2N×2N may not be partitioned (type 2N×2N), may be partitioned into two rectangular partitions having a size of 2N×N (type 2N×N), may be partitioned into two rectangular partitions having a size of N×2N (type N×2N), or may be partitioned into four quadrilateral partitions having a size of N×N (type N×N). The prediction unit is a basic unit for performing prediction, and the partition form of a possible prediction unit may be differently defined in the intra coding unit and the inter coding unit. For example, in the intra coding unit, only a 2N×2N or N×N type partition may be enabled, and the inter coding unit, 2N×2N, 2N×N, N×2N or N×N type partition may be enabled.

If the size of the current coding unit is larger than the predetermined minimum coding unit size, the N×N type partition may not be allowed because, in this case, the same result may be obtained as in the case in which the coding unit is partitioned again.

The partition is not necessarily performed symmetrically. FIG. 5 illustrates a case of asymmetrically partitioning a prediction unit.

Figure 6:
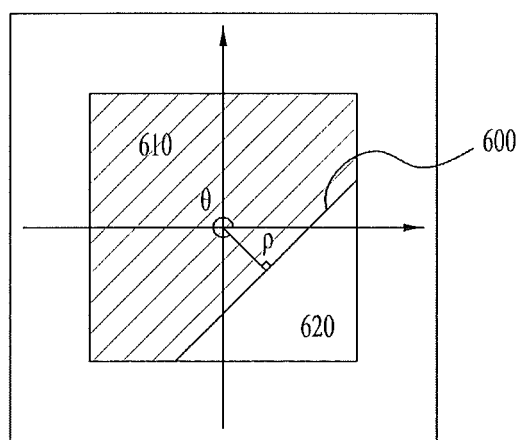
FIG. 6 illustrates a case of geometrically partitioning a prediction unit.

Further, the prediction unit partition is also geometrically possible. As shown in FIG. 6, partitions may be generated in various forms other than a quadrilateral form. In this case, the prediction unit may be partitioned into two partitions 610 and 620 through an arbitrary partition line 600. The partition information may be expressed as a distance (p) from the center, and an angle (θ) between a perpendicular line from the center (O) to the partition line and the basic axis (e.g., x-axis), etc. Such various forms of the prediction unit partition are advantageous in that more accurate prediction is possible for various forms of objects included in the image.

In the present specification, the unit to be coded is called a current unit, and the image including the current unit is called the current image. In order to restore the current unit, the decrypted information within the current image may be utilized or the decrypted portion of other images may be utilized. The image (slice), which uses only the current image for restoration, that is, performs only intra prediction (prediction within the screen), is called an intra picture or I picture (slice), the image (slice), which uses a maximum of one motion vector or reference index to predict each unit, is called a predictive picture or P picture (slice), and the image (slice), which uses a maximum of two motion vectors and reference indexes, is called a bi-predictive picture or B picture (slice).

In the intra prediction unit, the intra prediction, which predicts the pixel value of the subject unit from the restored areas within the current image, is performed. For example, the pixel value of the current unit may be predicted from the encoded pixels of the units, which are located in the upper, left, upper left and/or upper right sides, on the basis of the current unit.

The intra mode may be broadly classified into a vertical mode, a horizontal mode, a DC mode, an angular mode, etc. according to the direction of the reference area where reference pixels, which are used in predicting the pixel values, are located, and the prediction method. The vertical mode uses the value of a vertically neighboring area of the subject unit as the prediction value of the current unit, and the horizontal mode uses the horizontally neighboring area as the reference area. In the DC mode, the average value of the reference areas is used as the prediction value. Further, the angular mode is a case in which the reference area is located in an arbitrary direction, and the direction may be indicated by the angle between the current pixel and the reference pixel. For the convenience, the predetermined angle and the prediction mode number may be used, and the number of angles used may be changed according to the size of the subject unit.

Several specific modes may be defined and utilized with respect to such various prediction methods. The prediction mode may be transmitted by the value itself which indicates the mode, but in order to enhance transmission efficiency, the method of predicting the prediction mode value of the current unit may be utilized. Here, the prediction mode of the current unit may be acquired based on the information on whether the predicted value on the prediction mode is used as itself in the decoder and the difference with the actual value.

In the inter prediction unit, the inter prediction, which predicts the pixel value of the subject unit using information of already restored images other than the current image, is performed. The image used in prediction is called a reference picture. Which reference area is utilized in predicting the current unit in the inter prediction process may be indicated using the index indicating the reference image including the reference area (hereinafter, referred to as "reference index") and motion vector information, etc.

Some examples of the inter prediction (inter screen prediction) are forward direction prediction, backward direction prediction, and bi-prediction. Forward direction prediction is prediction which uses one reference picture displayed (or output) temporally prior to the current picture, and the backward prediction is a prediction which uses one reference picture displayed (or output) temporally after the current picture. To this end, one set of motion information (e.g., a motion vector and a reference picture index) may be needed. In bi-prediction, a maximum of two reference areas may be utilized, and these two reference areas may exist in the same reference picture, and may exist in different pictures. The reference pictures may be displayed (or output) temporally both before and after the current picture. In the bi-prediction method, a maximum of two sets of motion information (e.g., a motion vector and a reference picture index) may be utilized.

The motion information of the current prediction unit may include the motion vector information and the reference picture index. The motion vector information may mean the motion vector, the motion vector prediction value, or the differential motion vector, or may also mean index information which specifies motion vector prediction value. The differential motion vector means a difference between the motion vector and motion vector prediction value.

The reference block of the current prediction unit may be acquired using the motion vector and the reference picture index. The reference block exists within the reference picture having the reference picture index. Further, the pixel value of the block specified by the motion vector may be utilized as the predictor of the current prediction unit. That is, the motion compensation, which predicts the image of the current prediction unit by estimating the motion from the previously decoded picture, is used.

In addition to the current image, the reference image list may be constituted by images used for inter prediction. B slice needs two reference image lists, and the lists are referred to as reference list 0 and reference list 1, respectively. Among B slices, the slice, in which reference list 0 is the same as reference list 1, is particularly called GPB slice.

In order to reduce the transmission amount related with the motion vector, the motion vector prediction value may be acquired using the motion information of the coded units, and only the motion vector difference may be transmitted. In the decoder, the motion vector prediction value of the current unit may be acquired using motion information of other decoded units, and the motion vector value on the current unit may be acquired using the transmitted difference. When acquiring the motion vector prediction value, a motion vector competition method may be used, the method for acquiring various motion vector candidate values using the motion information of the already coded units and acquiring one motion vector prediction value among the candidate values.

The prediction information (e.g., the reference index, the motion vector, the prediction direction, etc.), which is needed in inter prediction of the current unit, is not directly included in the bitstream when transmitted, and may be induced using the neighboring unit. By using such a method, the compression rate may be enhanced by using the number of bits allocated to the prediction information. Specifically, the prediction information of the neighbor unit coded using inter prediction may be utilized as the prediction information of the current unit. When such a method is used, it is expressed that the current unit has been merged with the neighbor unit which delivered prediction information, and such a prediction method is called a merge mode.

For the merge mode, the bitstream may include information indicating whether the current unit has been merged (e.g., a flag like merge_flag), merger information indicating which neighbor unit has been merged with the current unit (e.g., a flag indicating whether the current unit has been merged with a certain neighbor, or index information indicating a certain neighbor, etc.), etc. The information indicating which neighboring unit has been merged with the current unit may be set to be acquired only when indicating that the current unit has been merged (in the above example, when merge_flag is true or 1).

Further, when using the inter prediction mode, the skip mode may be applied in units of the coding unit. The skip mode is a prediction method which transmits only certain information (e.g., information indicating which of the several motion vector prediction candidates will be used) among information for prediction restoration of the current units. In this case, information of other already coded units may be utilized as itself. When using the skip mode the amount of transmitted information may be reduced and thus, first, it is determined whether the coding unit is at the skip mode and otherwise, another mode (e.g., a merge mode, a direct prediction mode or a general inter prediction mode) may be used.

The merge mode may be applied in units of the coding unit, or may be applied in units of the prediction unit. In the case in which the merge mode is applied in units of the coding unit, a flag, which indicates whether to apply merger to each minimum coding unit that uses an inter prediction mode, is transmitted. As described above, the skip mode may be applied to the coding unit, and thus, after checking first whether the skip mode is to be applied in units of the minimum coding unit (e.g., using a method such as parsing and checking the flag indicating whether to apply the skip mode), only when the skip mode is not applied, the merge mode application flag may be acquired.

As described above, the coding unit may be partitioned in various forms in units of the prediction unit. In the case of applying the merge mode in units of the prediction unit, the merge flag is respectively obtained for all inter mode partitions to which the skip mode (or the direct prediction mode) is not applied.

Hereinafter, the specific operation of the merge mode is described. When operating in the merge mode, the unit to be targeted may include both the units of the coding unit and the prediction unit (partition).

The units, which may be merged with the current unit, are called merging candidates. The merging candidates may be selected as units adjacent to the current unit among already restored units. The unit, which is merged with the current unit, i.e., the unit which brings the prediction information, is called a unit to be merged. In order to determine the unit to be merged, information, obtained from the bitstream, indicating which neighbor unit has been merged may be utilized, and the unit to be merged may be induced using a specific rule.

Figure 8:
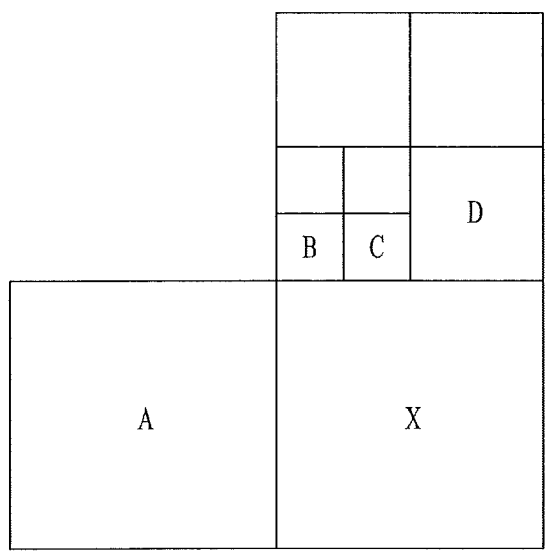
FIG. 8 illustrates a method for selecting merging candidates in consideration of a unit size.
Figure 9:
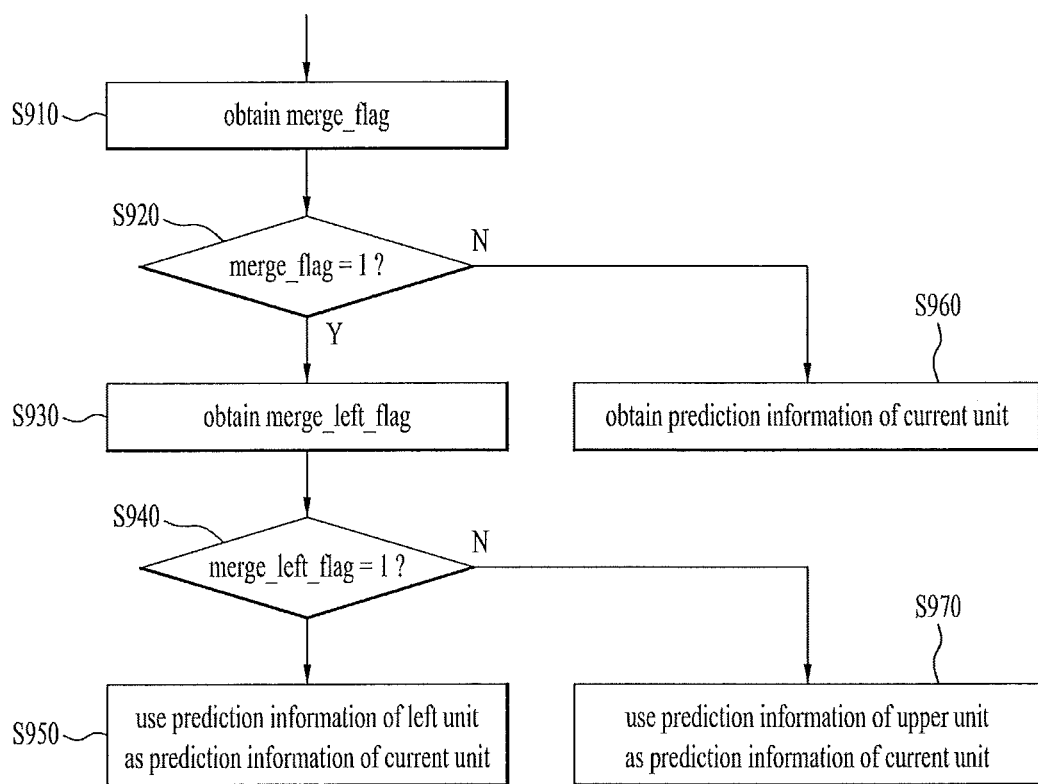
FIG. 9 is a flowchart illustrating a method for selecting a unit to be merged when there are two merging candidates.

Hereinafter, the types of units, which may become merging candidates based on the current unit, will be described with reference to FIGS. 7 and 8, the method for transmitting information needed for merger will be described with reference to FIGS. 9 and 10, and various embodiments for inducing the unit to be merged among merging candidate units will be described with reference to FIGS. 11 to 17.

Figure 7:
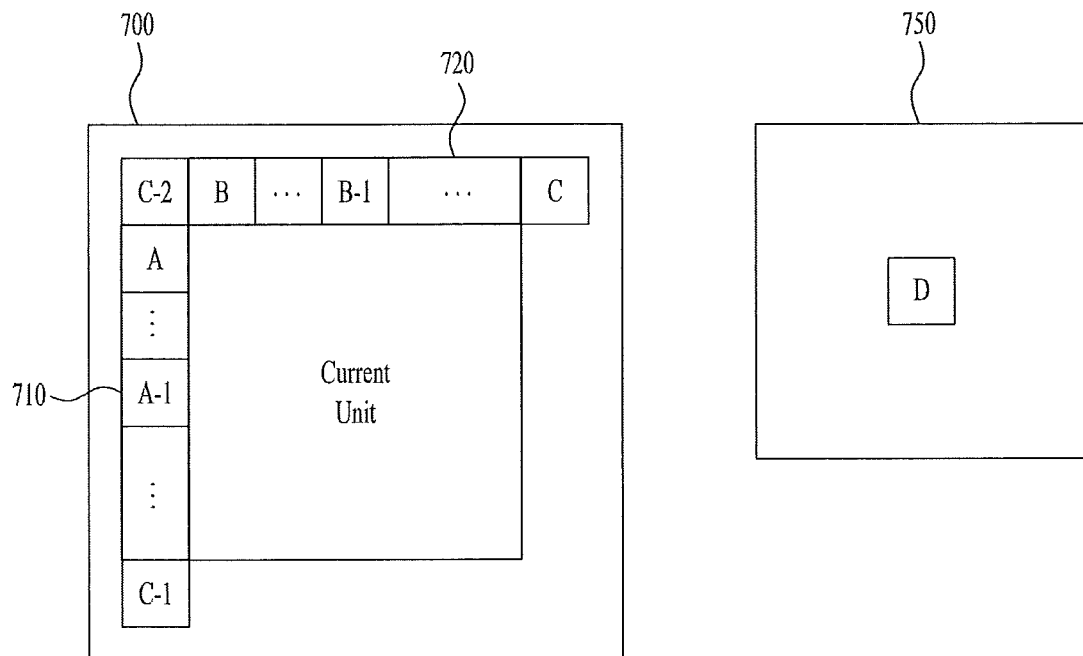
FIG. 7 illustrates merging candidates in various positions for a current unit.

FIG. 7 illustrates merging candidates in various positions for a current unit. Merging candidates may exist within the current image 700 where the current unit is located, or may exist within another already restored image 750. The units within the current image may be called spatial merging candidates, and the units within another image may be called temporal merging candidates. Some examples of spatial merging candidates are units 710 of the left area adjacent to the current unit, the units 720 of the upper area, and/or the units of the corner area (C, C-1, C-2). The temporal merging candidates may become units (D) located in a specific position of another image, for example, a position corresponding to the current unit, etc. Even if FIG. 7 illustrates units of a specific size, the size of each unit may vary depending on the partitioned level as described above.

For coding efficiency, the merging candidates may be selected as a certain number of units in consideration of coding efficiency and calculation complexity among the positions.

Some examples of the merging candidates are the uppermost unit (A) among the units of the left area, a unit (A-1) selected among the left area units except A, the leftmost unit (B) among the upper area units, a unit (B-1) selected among the upper area units except B, the unit (C) at the upper right corner, the unit (C-1) at the lower left corner, the unit (C-2) at the upper left corner, and a unit (D) corresponding to another image. It is obvious that, when there is only one unit adjacent to the current unit in the left or upper area, there is no additionally selected unit.

Similarly, it is possible to constitute merging candidates with the unit selected from the left area, the unit selected from the upper area, the cornet area units (C, C-1, C-2) and the unit (D) corresponding to another image, etc. Here, the number of units, which are selected in the left or upper area, may be preferably one (in this case, the maximum number of merging candidates would be 6), or a predetermined specific number. The corner area units may also be used by selecting only some of the units according to the need.

For simplification, the less number of units may be determined as merging candidates. For example, the uppermost unit (A) among the units of the left area, the leftmost unit (B) among the upper area units, the unit (C) at the upper right corner, the unit (C-1) at the lower left corner, and a unit (D) corresponding to another image, etc. may become merging candidates. In this case, the maximum number of merging candidates would be 5.

Most simply, only two units, for example, the uppermost unit (A; hereinafter, referred to as the upper neighbor unit) among the units of the left area, and the leftmost unit (B; hereinafter, referred to as the left neighbor unit) among the upper area units may become the merging candidates.

As mentioned above, the size of the unit may vary depending on the level of partition or partition mode. Hence, the merging candidates may be determined in consideration of the unit size as well as the position (the leftmost or uppermost, etc.). For example, selection may be made based on the length of the border adjacent to the current unit. That is, the unit, which is tangent to the longest outline among the units of the left or upper areas adjacent to the current unit, is selected. Referring to FIG. 8, for example, units B, C and D are positioned in the upper area adjacent to the current unit X. As described above, units B and C may be coding units which have been portioned once more compared to unit D, or may have been partitioned at a mode (N×N) other than the mode of unit D (2N×2N). Among units B, C and D, unit D is tangent to the current unit X by the longest outline, and thus unit D is selected as a merging candidate among the upper neighbor units. It is also possible to select one or more units in the above order among the upper neighbor units B, C and D. The merging candidates may also be selected in consideration of the area of the unit in addition to the length of the adjacent outline.

In the case in which the maximum number of the merging candidates is 2, information on which of the two candidates will be merged may be indicated by a one bit flag. FIG. 9 is a flowchart illustrating a process of selecting a unit to be merged in the above example in which the left neighbor unit A or the upper neighbor unit B becomes the merging candidate. First, A merging flag (merge_flag) indicating whether the current unit is coded in a merge mode is acquired (S901). If the current unit is coded in a merge mode based on the merging flag information (i.e., merge_flag=TRUE or 1), the merging direction flag (merge_left_flag) indicating with which unit has been merged is acquired (S930). The merging direction flag has TRUE (or 1) when merged with the left neighbor unit, and has FALSE (or 9) when merged with the upper neighbor unit. Hence, if the merging direction flag value is 1 (S940), the prediction information of the left neighbor unit A is used as prediction information of the current unit X (S950), and if the merging direction flag value is 0, the prediction information of the upper neighbor unit B is used as the prediction information of the current unit X (S970). In the case in which the merging flag indicates a case other than the merge mode, the prediction information of the current unit is acquired using a general prediction mode (S960). In the above, the merging direction flag is merely a certain embodiment, and thus such a flag does not necessarily indicate the merger with the left neighbor unit and may be used as a form that indicates whether to be merged with one specific unit among merging candidates.

In the case in which the maximum number of merging candidates is two or more, the unit to be merged cannot be specified with only the flag information, and thus other methods need to be utilized. For example, index information (merge index) on which unit among merging candidates will be merged, that is, information which specifies the unit to be merged, may be used. The index may be fixed in a certain order, or may be adaptively changed according to the situation.

Further, according to an exemplary embodiment of the present invention, the above information may be more efficiently transmitted depending on the case. That is, in a certain condition in which the above information does not need to be transmitted, such information transmission may be omitted.

Figure 10:
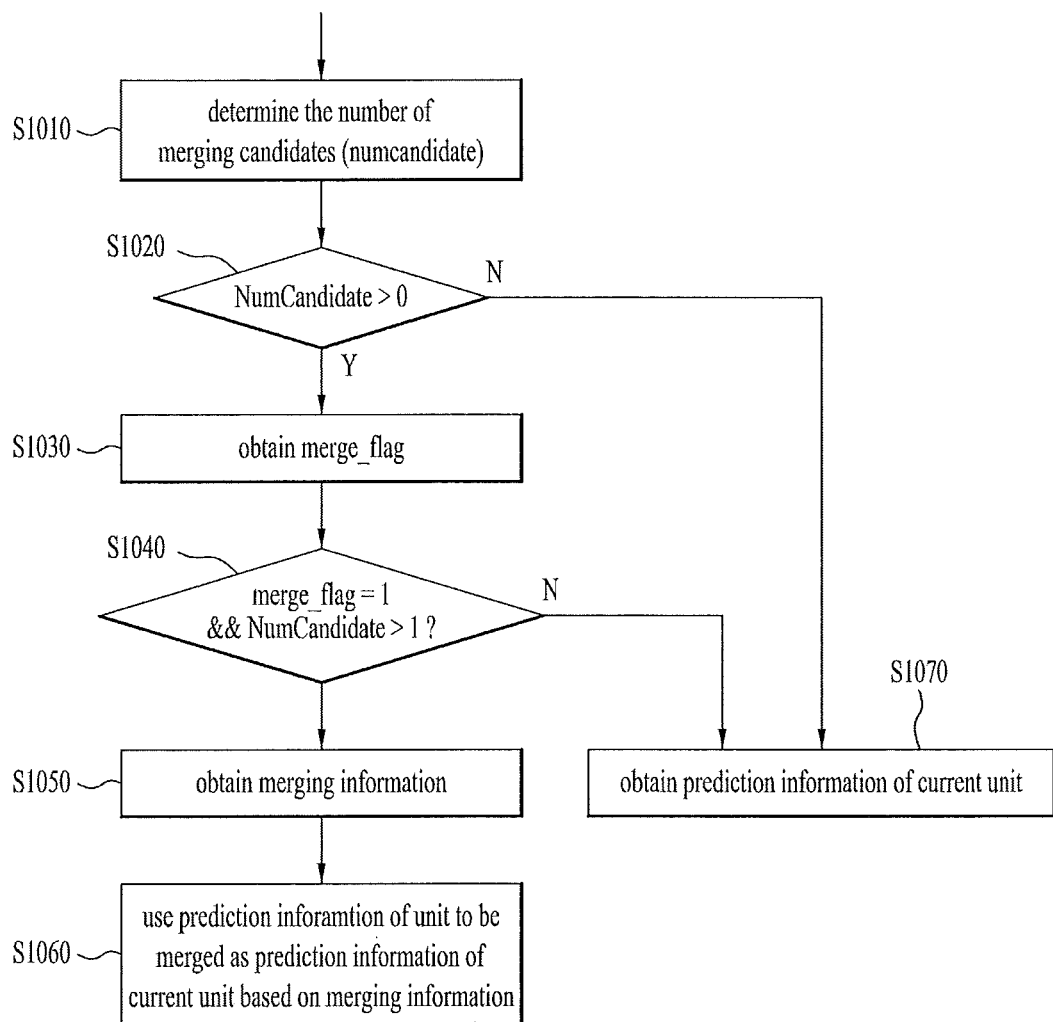
FIG. 10 is a flowchart illustrating a process of obtaining information which is necessary for a merging mode using the number of available merging candidates.

FIG. 10 is a flowchart illustrating a process of obtaining information which is necessary for a merge mode using the number of available merging candidates. First, the number of merging candidates (NumCandidate), which may be used by the current unit, is determined by checking the positions of the above described merging candidates (S1010). Being available here means that the current unit may obtain prediction information from the merging candidate unit. That is, this is the case in which the unit exists in the position, the unit is coded in the inter mode and has prediction information, and has already been decoded. If the number of available merging candidates is 0, the merging mode cannot be applied, and thus the merging flag (merge_flag), which indicates whether to be merged, does not need to be transmitted. In this case, the prediction information of the current unit is obtained using a general inter prediction mode (S1070). Hence, by checking the size of the number of available merging candidates (NumCandidate) (S1020), the merging flag (merge_flag) is obtained only when the number of the merging candidates is greater than 0 (S1030). In the case in which the number of the merging candidates is 1, one merging candidate may be determined as the unit to be merged. Hence, information (flag or index) on the unit with which the current unit is merged does not need to be separately transmitted, and thus only in the case in which the flag indicating whether to be merged is 1 and the number of merging candidates is greater than 1 (S1040), such merging information is obtained (S1050). The unit to be merged is determined based on the obtained merging information, and the prediction information of the unit to be merged is used as the prediction information of the current unit (S1060).

In the case in which the partition type of the coding unit of a 2N×2N size is 2N×2N, that is, in the case in which the coding unit is constituted by one partition, the direct prediction mode may be used. Hence, in this case, the number of merging candidates (NumCandidates) is set to 0 regardless of the motion information of the neighboring unit, and thereby the merge mode may be set not to be applied to the coding unit and related information may also be set not to be transmitted.

However, in this case, it may be impossible for the prediction information of the current unit (prediction direction, reference index, motion vector, etc.) to be expressed by the 2N×2N direction prediction mode. It may also be necessary to use an improved direction prediction mode for compensating a loss generated in such a case.

According to an exemplary embodiment of the present invention, variable signaling may be performed according to the number of merging candidates. For example, in the case in which the number of merging candidates, which are possible for the current unit, is 3, information for distinguishing 0 to 2 is transmitted, and in the case in which the number of the possible merging candidates is 2, only information for distinguishing 0 and 1 is transmitted. In this case, there is an advantage that the number of bits allocated to the index may be reduced when the number of merging candidates is small.

It is possible to use a method of changing the units which belong to the merging candidates after setting the maximum number of candidates. For example, predetermined positions are checked in order, and only the units corresponding in number to the maximum number of candidates become the merging candidates and the unit to be merged is selected among only the merging candidates. For example, it is assumed that the maximum number of candidates is 4, and the merging candidates are checked in the order of A, B, C, C-1, and D. If all the above units are available, the four units A, B, C and C-1 become the merging candidates according to the order. If unit C is not available in the above example, four units A, B, C-1 and D will be determined as merging candidates. If the number of available merging candidates is smaller than the maximum number of candidates, it is possible to use the above explained variable signal method according to the number of merging candidates.

Figure 11:
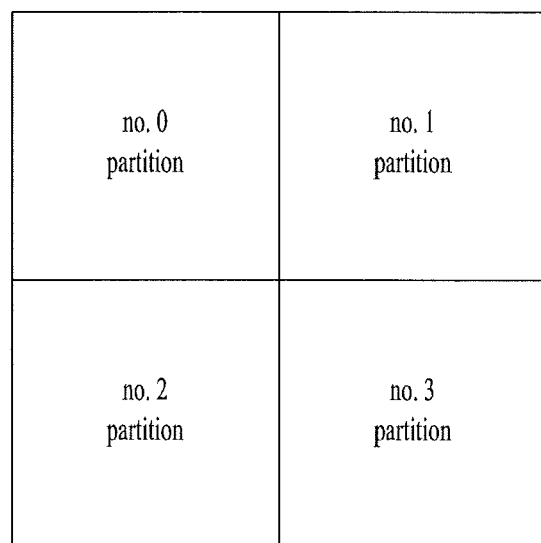
FIG. 11 illustrates a method for determining a unit which may be merged using motion information of a neighboring partition when the partition mode is an N×N type.

When the partition mode is N×N type, that is, the coding unit is constituted by four quadrilateral partitions, the condition for determining available merging candidates may be added in the fourth partition. Such a condition may be used in the process of counting the number of available merging candidates or inducing the units to be merged. Referring to FIG. 11, for example, in the case of partition no. 3, the partition, with which the current partition may be adaptively merged, is determined according to the motion information of other three partitions (partition nos. 0 to 2).

For example, when partition no. 0 and partition no. 1 have the same motion information and partition no. 2 has different motion information, partition no. 3 may not be merged with partition no. 2 because, in such a case, the partition would be redundant with the partition of a 2N×N type. Hence, in this case, partition no. 2 is exempted from the merging candidates.

When partition no. 0 and partition no. 2 have the same motion information and partition no. 1 has different motion information, partition no. 3 may not be merged with partition no. 1 because, in such a case, the partition would be redundant with the partition of an N×2N type. Hence, in this case, partition no. 3 is exempted from the merging candidates.

When partition no. 0, partition no. 1 and partition no. 2 all have the same motion information, partition no. 3 may not be merged with any of partition no. 1 and partition no. 2 because, in such a case, the partition would be redundant with the partition of a 2N×2N type. Hence, in this case, partition no. 1 and partition no. 2 are exempted from the merging candidates.

Figure 12:
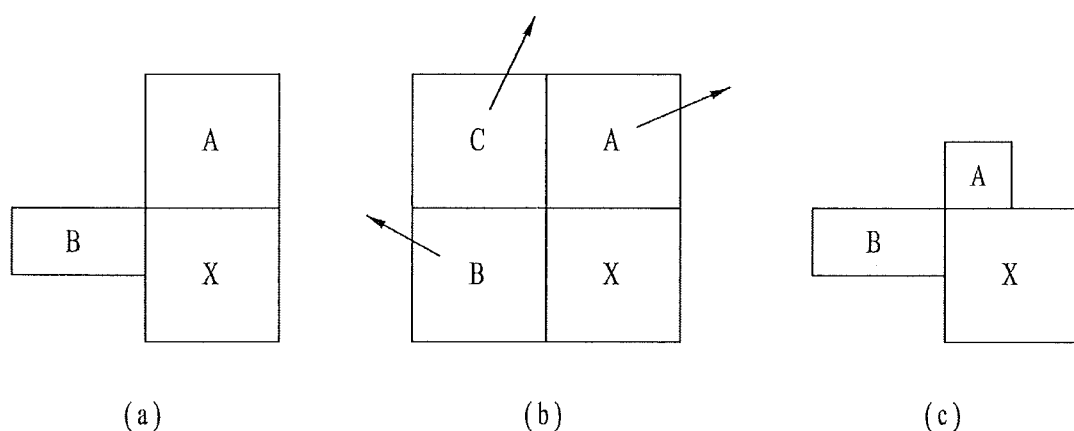
FIGS. 12 to 13 illustrate a method for inducing a unit to be merged.

Further, in order to reduce the number of bits for transmission of information for determining a unit to be merged, instead of transmitting the information, a method of inducing the unit to be merged according to a certain rule may be used. Hereinafter, referring to FIG. 12, a method of determining the unit to be merged among available merging candidate units will be described. In FIG. 12, it is assumed that only units A and B are merging candidate units for the convenience of explanation, but the units of the above described various positions may become the merging candidates.

According to an exemplary embodiment of the present invention, the unit to be merged may be selected on the basis of the length of the outline by which the current unit is tangent to the neighboring unit. Referring to FIG. 12(a), for example, the outline between the current unit X and the upper neighboring unit A is longer than the outline between the current unit A and the left neighbor unit B, and thus the unit to be merged is selected as the upper neighbor unit A. That is, the current unit X is merged with the upper neighbor unit A, and the prediction information of the upper neighbor unit A is used as the prediction information of the current unit X.

According to an exemplary embodiment of the present invention, the unit, which has a motion vector most similar to the neighbor unit of a certain position (e.g., upper left) among the neighbor units of the current unit, may be selected as the unit to be merged of the current unit. Referring to FIG. 12(b), for example, the upper neighbor unit A has a motion vector which is more similar to the upper left neighbor unit C than the left neighbor unit B, and thus the upper neighbor unit A is selected as the unit to be merged.

According to an exemplary embodiment of the present invention, the unit of a wider area among merging candidates may be selected as the unit to be merged. Referring to FIG. 12(c), for example, the area of the left neighbor unit B is larger than the upper unit A, and thus the left neighbor unit B is selected as the unit to be merged.

Further, the above embodiments may be combined with a certain order of priority.

Figure 13:
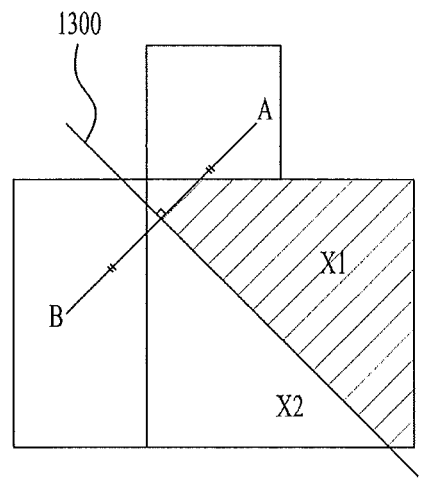

According to an exemplary embodiment of the present invention, when a merge mode is used, the current unit is automatically geometrically partitioned, and each partition area is merged with the adjacent neighbor unit. Referring to FIG. 13, for example, the current unit is partitioned as X1 and X2 along the partition line 1300. The partition line 1300 is determined using the Euclidean distance of neighbor units A and B which are merging candidates. Consequently, X1 is merged with A, and X2 is merged with B.

Further, in the partitioned unit, when there is no adjacent area or there is only one adjacent area, the unit to be merged may be induced without transmitting specific information.

Figure 14:
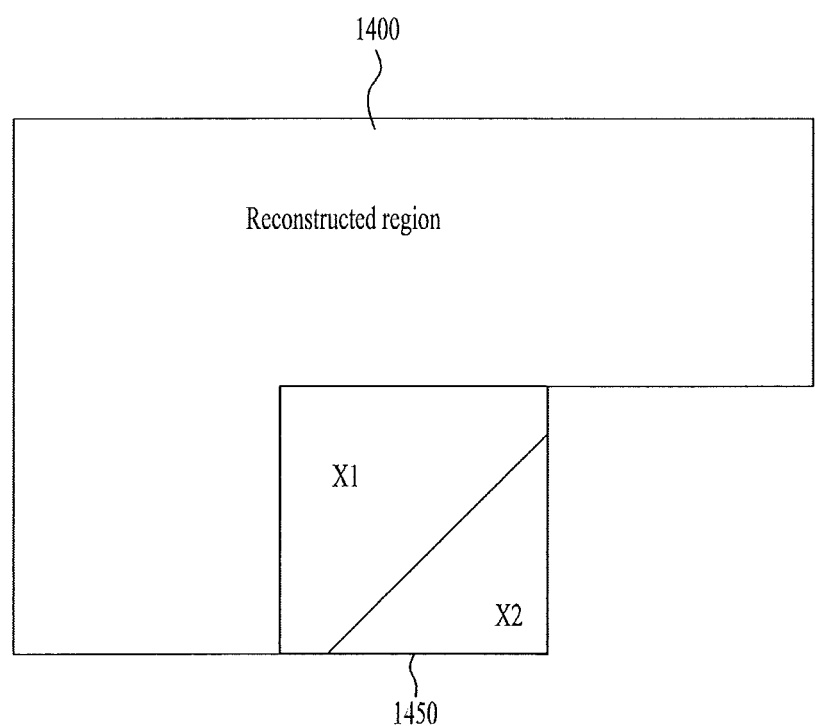
FIGS. 14 to 17 illustrate a method for inducing a unit to be merged in a specific partition.

According to an exemplary embodiment of the present invention, in the case of a geometric partition, there may be no adjacent restored area. FIG. 14 illustrates a case in which the current unit has been geometrically partitioned. In this case, the current unit is partitioned into two partitions, i.e., X1 and X2, and X2 is not adjacent to the reconstructed region. Here, in the case of partition X2, the merger with X1 may not be allowed. It is because, when X1 and X2, which belong to the same coding unit, have the same prediction information due to the merger, there is no need for partition. Hence, in such a situation, the merge mode cannot be applied to partition X2. In this case, as in the case in which the number of available merging candidates is 0, both the flag indicating whether to be merged and information indicating the unit to be merged may not be obtained.

Figure 15:
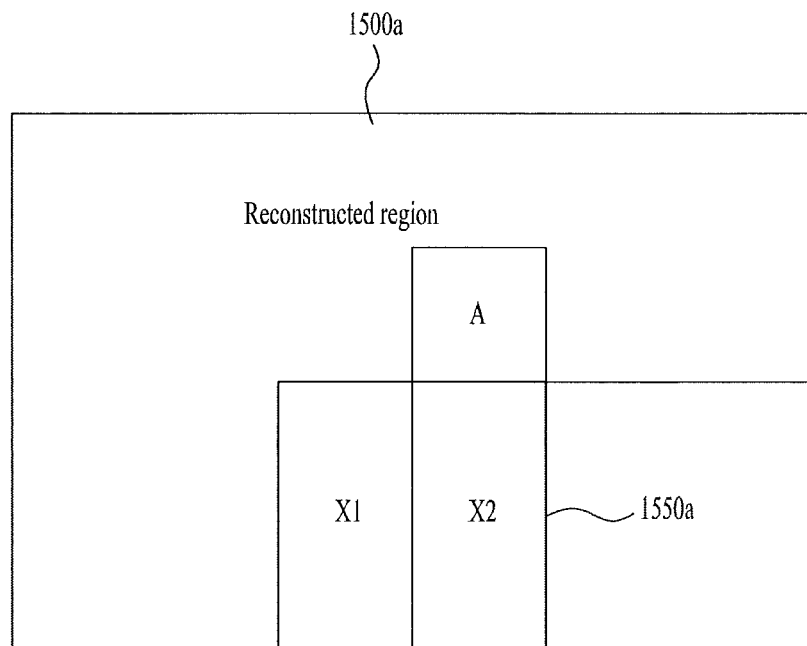
Figure 15:
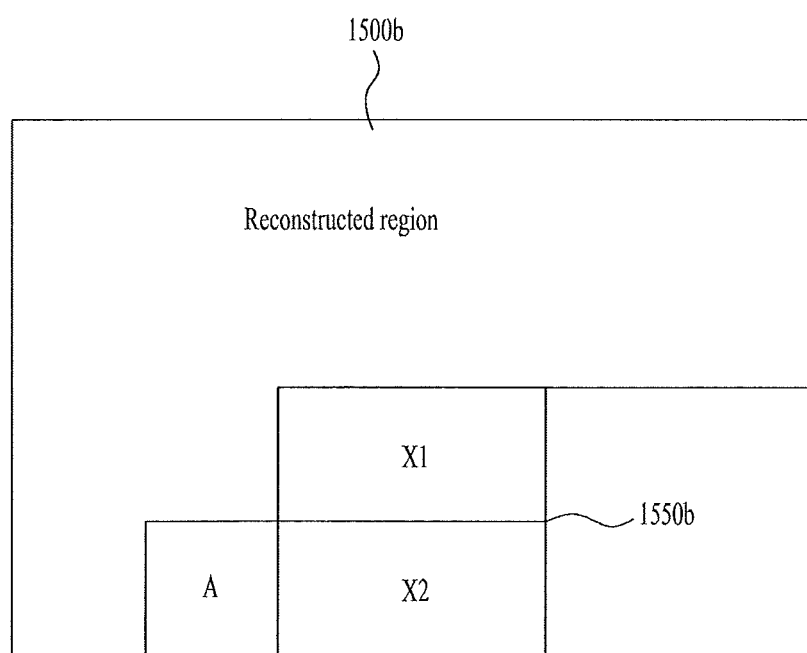

FIG. 15 illustrates a case in which the current unit is partitioned into two rectangular partitions. Referring to FIG. 15(a), in the case of partition X2, the upper area is adjacent to the restored area, but the left area is adjacent to partition X1 which belongs to the same coding unit. Similarly to the above description, the situation in which partition X2 is merged with partition X1, which belongs to the same coding unit, and comes to have the same prediction information, is redundant with the non-partitioned case, and thus such a case needs to be exempted. Hence, in the case of X2, the merging mode may need to be applied, but the units of the left area may not be merging candidates. When counting the number of available merging candidates, such points may be considered. As described above, if only two kinds, that is, the left unit and the upper unit, may become merging candidates (that is, if flag information is transmitted to indicate the unit to be merged), the transmission of the flag to indicate the unit to be merged is not necessary with respect to X2. The number of merging candidates is large, and when adaptive index information described above is used, it is advantageous in that the amount of the information to be used in the index is reduced.

Further, the unit having prediction information same as the prediction information of another partition X1, which belongs to the coding unit same as the current unit, cannot be an available merging candidate. When the same coding unit is partitioned into two partitions, that is, X1 and X2, the case in which X2 is merged with a certain unit and comes to have the value same as the prediction information of X2 leads to a result same as in the merger with X1. Hence, in this case, the partition of one coding unit into X1 and X2 becomes meaningless. Therefore, in the present invention, units, which search for the prediction information same as X1 among merging candidate units of various positions that may become prediction candidates in the above, are deleted from the available merging unit candidates. That is, the number of merging unit candidates, which may be used by the current partition, is reduced by the number of merging candidates having prediction information same as that of another partition X1 which belongs to the same coding unit. In this way, the number of available merging candidate units becomes 0, the merging flag indicating whether to apply the merge mode may not need to be transmitted. For example, referring to FIG. 15(a), in the case in which the prediction information of the upper neighbor unit A is the same as that of X1, X2 cannot be merged with any of A and X1. Hence, in this case, since there is no available merging candidate unit, both the flag indicating whether to apply the merge mode and information indicating the unit to be merged need not be transmitted. That is, this is the same as the case in which the number of available merging candidates is 0.

In contrast, in the case of FIG. 15(b), the left side of partition X2 is adjacent to the restored region, but the upper side is not adjacent to the restored region and becomes adjacent to another partition X1 which belongs to the same coding unit. Hence, in this case, X2 is not merged with X1, and only the left area becomes an available merging candidate. In the case of the example of FIG. 15(b), the remaining merging candidate is only unit A, and thus the flag information for designating the unit to be merged does not need to be transmitted. Likewise, the units having the prediction information same as X1 cannot be merged with X2, and thus in the case in which the left adjacent area A of X2 has the prediction information same as that of X1, no available merging candidate unit remains and the merging flag information indicating whether to apply the merge mode does not need to be transmitted.

Figure 16:
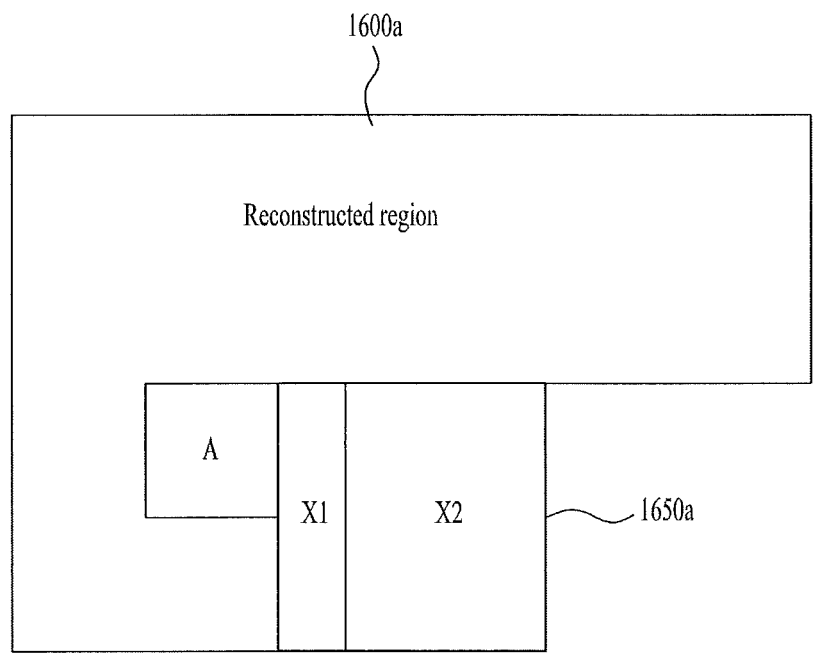
Figure 16:
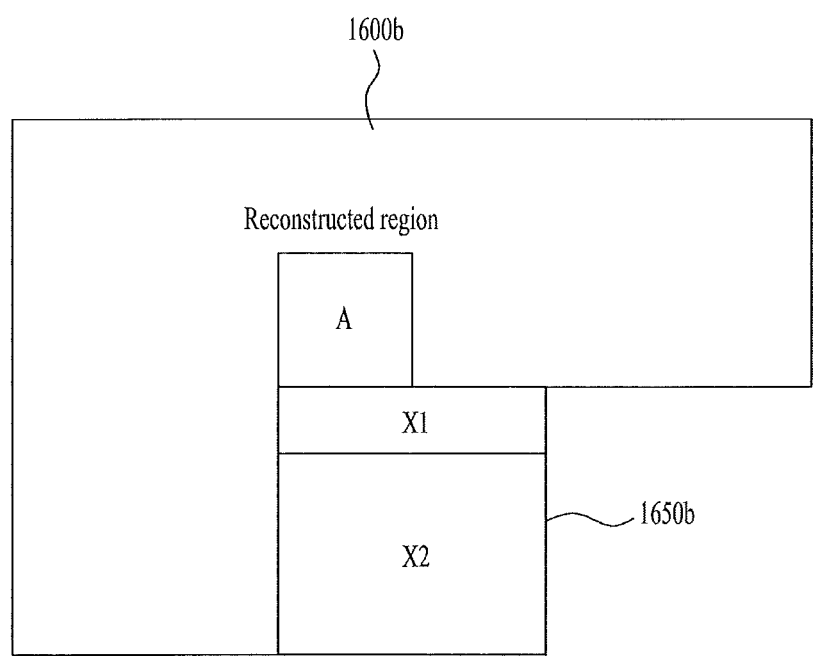

FIG. 16 illustrates several examples in the case in which a unit is asymmetrically partitioned into two partitions. Here, a partition, which occupies a smaller area, may be set to be merged with only a unit adjacent to the long side. In the case of FIG. 16(a), the long side of X1 is the left area, and in the case in which one of the left area or the upper area is selected, the unit to be merged is determined as unit A without transmitting the flag (merge_left_flag) which designates the unit. In the case of FIG. 16(b), the long side of the X1 is the right area, and the unit to be merged is determined as unit A in the situation same as the above.

Figure 17:
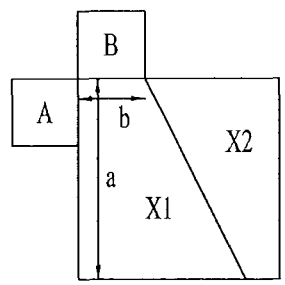
Figure 17:
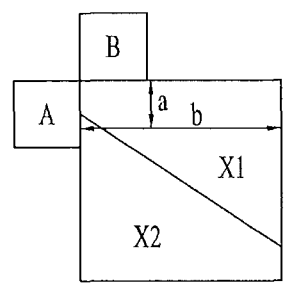
Figure 17:
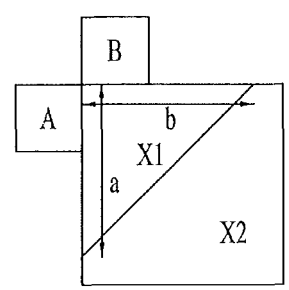

FIG. 17 illustrates several examples in the case in which a unit is geometrically partitioned into two partitions. In this case, the unit to be merged may be induced according to the partition type. Here, the partition type may be considered using the length of the border line between the partition and the reconstructed region. Referring to FIG. 17, with respect to the first geometric partition X1, it is assumed that the length of the border line between the X1 and the left restored area is a, the length of the border line between the X1 and the upper restored area is b, and c1 and c2 are predetermined certain thresholds. FIGS. 17(a) and 17(b) indicate the partition types of various geometric partitions, and this may be specified as a specific value using a and b, for example, a value like a/b. Further, the unit to be merged is determined using the relation between this value and the threshold.

For example, as shown in FIG. 17(a), in the case in which a/b is larger than c1 (a/b>c1), the unit to be merged of X1 is determined as A. In contrast, as shown in FIG. 17(b), in the case in which a/b is smaller than c2 (a/b<c2), the unit to be merged of X1 is determined as B. In these two cases, information indicating which of A and B is merged does not need to be transmitted. As shown in FIG. 17(c), in the case in which a/b is between c1 and c2 (c2<=a/b<=c1), separate information indicating which of A and B is the unit to be merged is transmitted.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

A decoding/encoding method, to which the present invention is applied, is configured with a program for computer execution and then stored in a computer-readable recording medium. And, multimedia data having a data structure of the present invention can be stored in computer-readable recording medium. The computer-readable recording media include all kinds of storage devices for storing data that can be read by a computer system. The computer-readable recording media include ROM, RAM, CD-ROM, magnetic tapes, floppy discs, optical data storage devices, etc. and also includes a device implemented with carrier waves (e.g., transmission via internet). And, a bit stream generated by the encoding method is stored in a computer-readable recording medium or transmitted via wire/wireless communication network.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to encoding or decoding a video signal.

The invention claimed is:

1. A method for decoding a bitstream for a video signal comprising at least one coding block by a decoding apparatus, the method comprising:
obtaining, by the decoding apparatus, merge flag information of a current prediction block of a plurality of prediction blocks from the bitstream, the plurality of prediction blocks being partitioned from the coding block; and
based on the merge flag information indicating that prediction information of the current prediction block is determined by prediction information of one of merging candidates, decoding, by the decoding apparatus, the current prediction block based on prediction information of a merging candidate selected from among the merging candidates,
wherein, based on the coding block being partitioned into two prediction blocks each of which has a horizontal size greater than a vertical size and the current prediction block being a bottom prediction block of the two prediction blocks, the merging candidates comprise at least one neighboring prediction block adjacent to the current prediction block other than a top prediction block of the two prediction blocks.

2. The method of claim 1, wherein each of the prediction information comprises reference index information and motion vector information of a corresponding prediction block.

3. The method of claim 1, wherein the current prediction block is coded in an inter-prediction mode.

4. The method of claim 1, wherein each of the at least one neighboring prediction block is coded in an inter-prediction mode.

5. The method of claim 1, wherein based on the coding block being partitioned into two prediction blocks each of which has a vertical size greater than a horizontal size and the current prediction block being a right prediction block of the two prediction blocks, the merging candidates comprise at least one neighboring prediction block adjacent to the current prediction block other than a left prediction block of the two prediction blocks.

6. The method of claim 1, wherein the at least one neighboring prediction block includes at least one of a left neighboring prediction block, a top-left neighboring prediction block, a top-right neighboring prediction block, or a bottom-left neighboring prediction block.

7. The method of claim 1, further comprising:
obtaining, by the decoding apparatus, merge index information from the bitstream,
wherein the merge index information indicates the selected merging candidate from among the merging candidates.

8. The method of claim 1, wherein the merging candidates include up to five neighboring prediction blocks adjacent to the current prediction block.

9. A decoding apparatus for decoding a bitstream for a video signal comprising at least one coding block, the decoding apparatus comprising:
an entropy decoding unit configured to obtain merge flag information of a current prediction block of a plurality of prediction blocks from the bitstream, the plurality of prediction blocks being partitioned from the coding block; and
an inter prediction unit configured to, based on the merge flag information indicating that prediction information of the current prediction block is determined by prediction information of one of merging candidates, decode the current prediction block based on prediction information of a merging candidate selected from among the merging candidates,
wherein, based on the coding block being partitioned into two prediction blocks each of which has a horizontal size greater than a vertical size and the current prediction block being a bottom prediction block of the two prediction blocks, the merging candidates comprise at least one neighboring prediction block adjacent to the current prediction block other than a top prediction block of the two prediction blocks.

10. The decoding apparatus of claim 9, wherein each of the prediction information comprises reference index information and motion vector information of a corresponding prediction block.

11. The decoding apparatus of claim 9, wherein the current prediction block is coded in an inter-prediction mode.

12. The decoding apparatus of claim 9, wherein each of the at least one neighboring prediction block is coded in an inter-prediction mode.

13. The decoding apparatus of claim 9, wherein based on the coding block being partitioned into two prediction blocks each of which has a vertical size greater than a horizontal size and the current prediction block being a right prediction block of the two prediction blocks, the merging candidates comprise at least one neighboring prediction block adjacent to the current prediction block other than a left prediction block of the two prediction blocks.

14. The decoding apparatus of claim 9, wherein the at least one neighboring prediction block includes at least one of a left neighboring prediction block, a top-left neighboring prediction block, a top-right neighboring prediction block, or a bottom-left neighboring prediction block.

15. The decoding apparatus of claim 9, wherein the entropy decoding unit is further configured to obtain merge index information from the bitstream,
wherein the merge index information indicates the selected merging candidate from among the merging candidates.

16. The decoding apparatus of claim 9, wherein the merging candidates include up to five neighboring prediction blocks adjacent to the current prediction block.

17. A method for encoding a bitstream for a video signal comprising at least one coding block by an encoding apparatus, the method comprising:
encoding, by the encoding apparatus, merge flag information of a current prediction block of a plurality of prediction blocks into the bitstream, the plurality of prediction blocks being partitioned from the coding block; and
based on the merge flag information indicating that prediction information of the current prediction block is determined by prediction information of one of merging candidates, encoding, by the encoding apparatus, the current prediction block based on prediction information of a merging candidate selected from among the merging candidates,
wherein, based on the coding block being partitioned into two prediction blocks each of which has a horizontal size greater than a vertical size and the current prediction block being a bottom prediction block of the two prediction blocks, the merging candidates comprise at least one neighboring prediction block adjacent to the current prediction block other than a top prediction block of the two prediction blocks.

18. A non-transitory computer-readable medium in which the bitstream generated by the method of claim 17 is stored.

19. An encoding apparatus for encoding a bitstream for a video signal comprising at least one coding block, the encoding apparatus comprising:
an entropy coding unit configured to encode merge flag information of a current prediction block of a plurality of prediction blocks into the bitstream, the plurality of prediction blocks being partitioned from the coding block; and
an inter prediction unit configured to, based on the merge flag information indicating that prediction information of the current prediction block is determined by prediction information of one of merging candidates, encode the current prediction block based on prediction information of a merging candidate selected from among the merging candidates,
wherein, based on the coding block being partitioned into two prediction blocks each of which has a horizontal size greater than a vertical size and the current prediction block being a bottom prediction block of the two prediction blocks, the merging candidates comprise at least one neighboring prediction block adjacent to the current prediction block other than a top prediction block of the two prediction blocks.

* * * * *